March 27, 1945.
G. W. TODD
2,372,459
TRACTOR PLOW HITCH
Filed Feb. 25, 1942
3 Sheets-Sheet 1
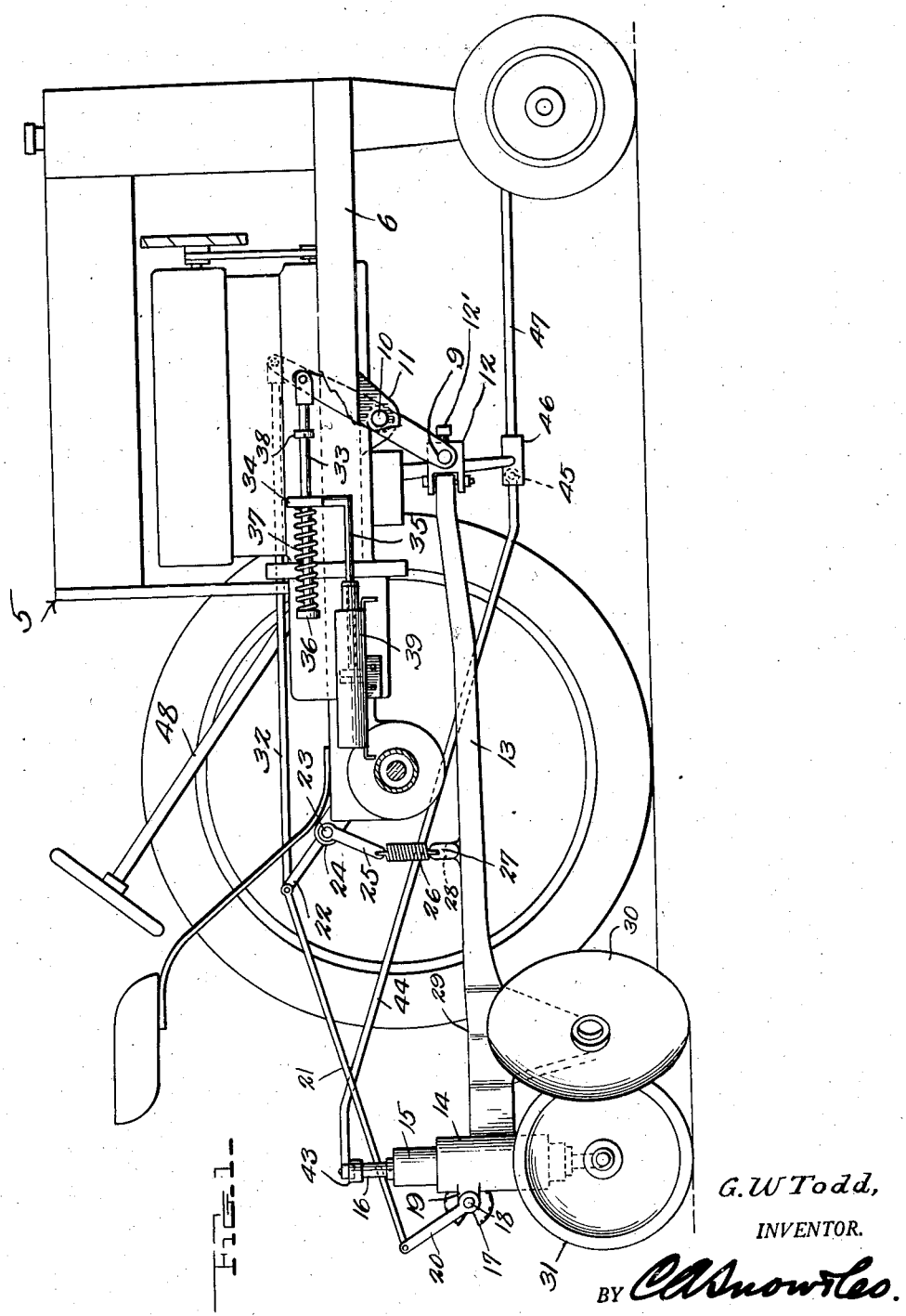
G. W. Todd,
INVENTOR.

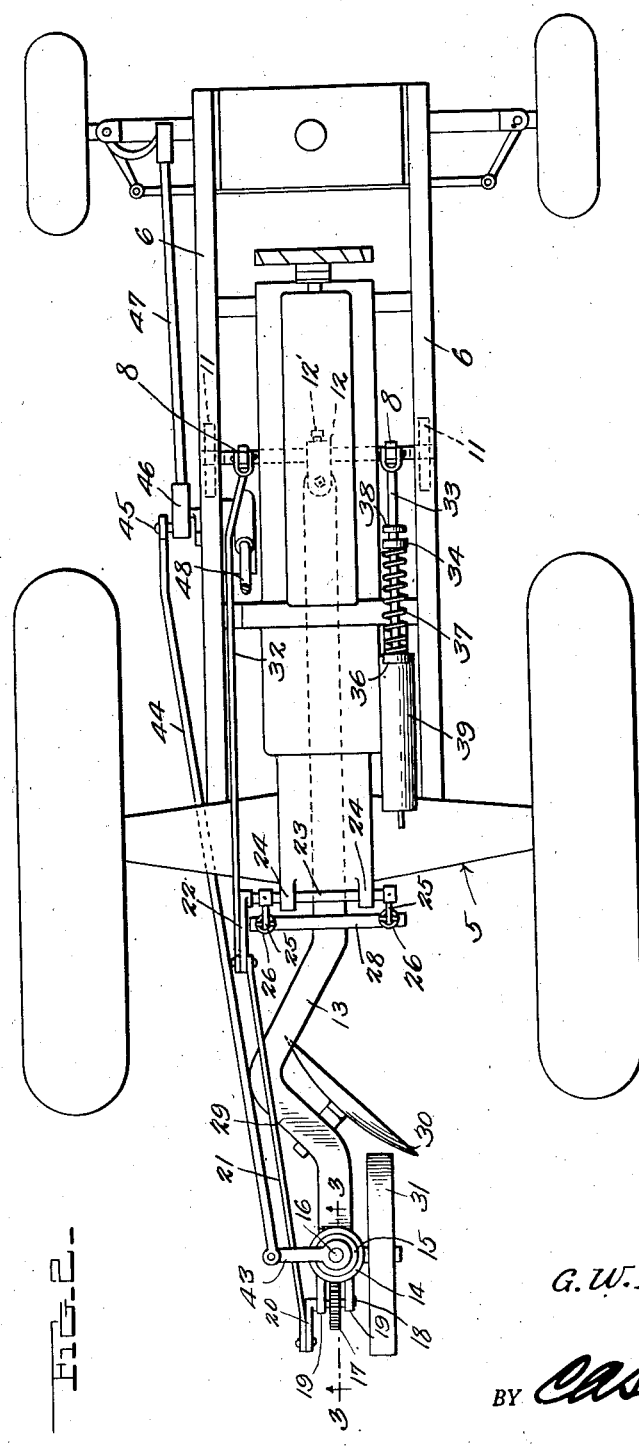

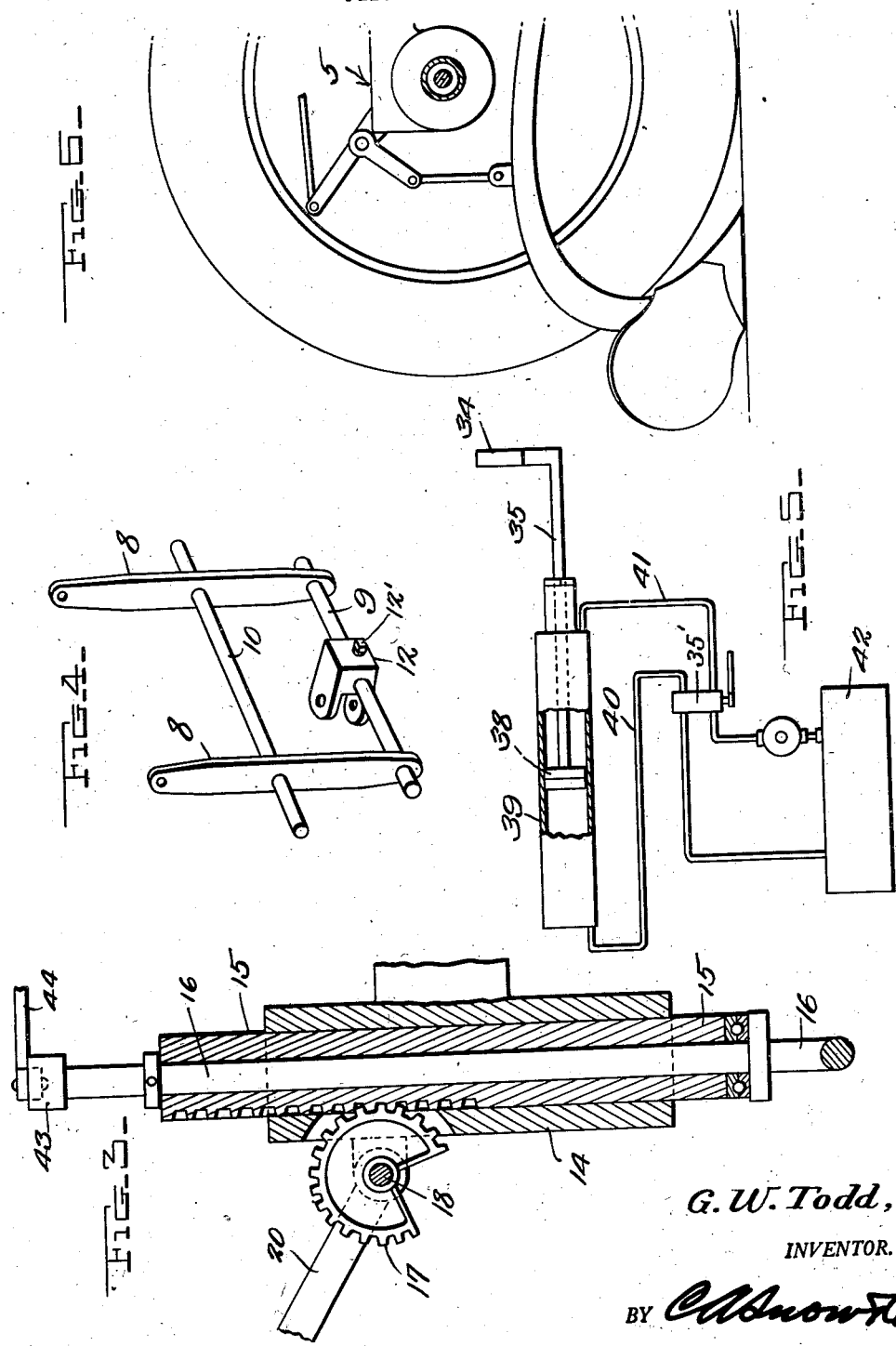

Patented Mar. 27, 1945

2,372,459

UNITED STATES PATENT OFFICE 2,372,459

TRACTOR PLOW HITCH

Garry W. Todd, Charlotte, N. C.

Application February 25, 1942, Serial No. 432,331

5 Claims. (Cl. 97—47)

This invention relates to tractor plows, and more particularly to the hitch used in connecting the plow with the tractor.

The primary object of the invention is to provide a tractor plow, wherein the plow will be maintained at a predetermined working depth at all times, when the tractor moves over rolling or uneven ground surfaces.

An important object of the invention is to provide connecting means between the plow beam and tractor, which will automatically operate to raise or lower the plow blade, thereby compensating for irregularities in the ground surface.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a side elevational view of a tractor, illustrating a plow beam hitched to the tractor, in accordance with the invention.

Figure 2 is a plan view of the tractor plow.

Figure 3 is a sectional view taken on line 3—3 of Fig. 2.

Figure 4 is a perspective view illustrating the pivotal links which connect the plow beam to the tractor.

Figure 5 is a diagram, illustrating the hydraulic cylinder, forming a part of the plow beam operating mechanism.

Figure 6 is a fragmental elevational view illustrating a furrow plow as connected with the tractor.

Referring to the drawings in detail, the reference character 5 designates a tractor, the reference character 6 indicating the usual side rails of the tractor chassis.

Pivotally connected with the side rails 6 of the chassis, and disposed substantially intermediate the ends of the side rails, are the arms 8 which are connected by means of the rods 9 and 10, the rod 10 which is extended through openings in the arms 8, extending appreciable distances beyond the arms 8, as clearly shown by Figure 4 of the drawings. The extended ends of the rod 10 are pivotally mounted in bearing openings formed in the depending ears 11, formed on the side rails 6.

The forward end of the plow beam 13 is pivotally connected to the yoke 12 mounted on the rod 9. The yoke 12 is adapted to be secured in its positions of adjustment by means of the threaded bolt 12' with the result that plows of various sizes, may be used.

Formed at the rear end of the plow beam 13 is a vertical, cylindrical bearing 14 in which the sleeve 15 operates. This sleeve 15 is secured to the vertical shaft 16 to move therewith. Teeth are formed in the sleeve 15, and cooperate with the teeth of the mutilated gear 17 secured on the shaft 18 that in turn is mounted in bearings 19 which form a part of the bearing 14.

Connected with the shaft 18 is an arm 20 to which a control rod 21 is connected, the control rod 21 being also connected with the arm 22 secured to one end of the shaft 23. This shaft 23 is mounted in bearings 24 that extend from the crank case housing of the tractor.

Arms 25 are also connected with the shaft 23 and are provided with openings through which the upper ends of the coiled springs 26 extend, the lower ends of the coiled springs being disposed in openings formed in the upturned ends 27 of the rod 28.

This rod 28 is secured to the beam 13, at a point substantially intermediate the ends thereof.

As clearly shown by Figure 2 of the drawings, the beam 13 is formed with an offset portion 29 to which the disk 30 is connected.

The lower end of the vertical shaft 16, is formed into an axle, on which the wheel 31 is mounted, the wheel 31 providing a support for the rear end of the plow beam 13. Connected with the arm 22, is a rod 32 that extends forwardly, and connects with one of the arms 8 at one side of the frame.

Connected with the arm 8 at the opposite side of the frame, is a rod 33 that is mounted in an opening formed in the upstanding end 34 of the piston rod 35. A head 36 is formed on one end of the movable rod 33 and acts as a stop against which one end of the coiled spring 37 engages, the opposite end of the coiled spring engaging the upstanding end 34 of the piston rod 35, so that movement of the rod 35 will be controlled and cushioned, by the coiled spring. An adjusting nut 38 provides a stop, to limit the movement of the rod 33, in one direction.

The piston rod 35 carries the piston 38 on one end thereof, the piston 38 operating in the cylinder 39 that is mounted on the tractor frame. Pipes 40 and 41 connect with the ends of the cylinder 39 and also have connection with the liquid supply chamber 42, to the end that movement of the piston within the cylinder, will operate to move the liquid from one end of the cylinder, through the liquid supply chamber, and return the liquid to the cylinder, at the opposite side of the piston.

A valve indicated at 35' is disposed in the pipes 40 and 41 and may be operated manually to increase the fluid pressure at either side of the piston 38, to move the rod 35 forwardly, relieving the tension of spring 37, or move the rod 35 rearwardly against the action of the spring 37, to lower the plow beam 13.

While the vertical shaft 16 is mounted for vertical movement, it is also mounted within the bearing or sleeve 15, for rotary movement. At the upper end of the vertical shaft 16 is a laterally extended arm 43 to which the rod 44 is connected. The forward end of the rod 44 connects with the pin 45 that extends from the head 46 of the rod 47 that connects with the steering knuckles of the tractor. The head 46 forms a part of the usual steering mechanism, and is moved to guide the tractor, by means of the steering column 48. Thus it will be seen that due to this construction, the rear supporting wheel 31 is moved with the front or steering wheels of the tractor, to eliminate drag of the disk or plow supported by the plow beam 13, when the tractor is being turned.

In the operation of the tractor plow, it will be obvious that when the plow moves into an irregularity in the ground surface, such as a mound, hill or the like, the added strain directed to the plow blade, caused by the plow being directed deeper into the ground, will cause a pull to be directed to the lower ends of the arms 8, the upper ends of the arms moving forwardly. Assuming that the piston 38 has moved forward in cylinder 39 where the end 34 of the rod 35 is in a position to engage the adjusting nut 36 on the rod 33, it is obvious that the tension on spring 37 is decreased to the point where it has practically no power. With the rod 35 in this position, if light backward pressure is applied at plow blade 30, the spring 37 offering slight resistance, the whole mechanism from arms 8 at the front, back to sleeve 15 will move into operation. The result of this movement is to raise the plow and beam upwardly. If reverse movement takes place in cylinder 39, the piston 38 will be caused to move toward the rear. With this movement, it will be readily seen that the tension on spring 37 is increased according to the distance that piston and rod travel toward the rear, and as the tension on the spring 37 is increased, the plow blade 30 penetrates to a greater depth and will continue its downward movement until the pounds pulled at 30, equal the tension of the spring 37.

When the plow blade moves upwardly as in striking a ditch or furrow, the reverse action of the arms 8 takes place, resulting in the plow being directed downwardly to again compensate for such hollow or recess in the ground surface.

During the movement of the arms 8 and plow beam as described, the piston rod is moved against the fluid within the cylinder 39, cushioning the movements of the plow.

What is claimed is:

1. In a tractor plow, a tractor, a pivoted plow beam connecting member mounted on the tractor at a point intermediate the ends of the tractor, a plow beam connected to the connecting member, a plow blade mounted on the plow beam, a vertical cylindrical bearing secured at the rear end of the plow beam, a sleeve mounted within the cylindrical bearing, a vertical shaft secured to the sleeve, a supporting wheel mounted on the lower end of the vertical shaft and adapted to support the rear end of the plow beam, teeth formed on the sleeve, a gear meshing with the teeth of the sleeve and adapted to move the sleeve vertically, and means controlled by the movement of the plow beam connecting member for operating the gear and sleeve, raising and lowering said wheel, and regulating the depth of operation of the plow blade.

2. In a tractor plow, a tractor, a plow beam on which a plow blade is mounted, means for pivotally connecting the forward end of the plow beam to the tractor, said connecting means embodying pivoted arms connected to the tractor and adapted to pivot when the plow blade moves above or below a predetermined operating level, a vertically movable supporting wheel mounted at the rear end of the plow beam, a control rod mounted on the tractor, yieldable means connecting the control rod to the pivoted arm, means for transmitting movement of the control rod to said supporting wheel, whereby said supporting wheel and plow beam are moved vertically, regulating the depth of operation of the plow blade.

3. In a tractor plow, a tractor, a horizontal pivoted rod mounted on the tractor frame substantially intermediate the front and rear ends thereof, vertical arms connected with said rod, the lower ends of the arms extending below said rod, a rod connecting the lower ends of the arms, a plow beam pivotally connected to the latter rod and adapted to move forwardly in a horizontal direction with the movement of the arms, means for restricting pivotal movement of said arms, said means embodying a cylinder containing liquid, a piston and piston-rod operating within the cylinder, said piston-rod having an eye formed at one end thereof, a rod having a head on one of its ends extended through the eye and being connected with one of said arms, a coiled spring on the latter rod and engaging the head and eye, and means for increasing or diminishing the normal liquid pressure within the cylinder at either side of the piston whereby the tension of said spring is regulated, a vertically movable wheel mounted on the plow beam, a rod connected with one of said vertical arms, an arm connected with the rod and adapted to move the vertically movable wheel adjusting the depth of operation of the plow carried thereby.

4. In a tractor plow, a tractor, a pivoted connecting member mounted intermediate the ends of the tractor, said pivoted connecting member comprising an upper pivot rod and a lower connecting rod, arms connecting the rods, a yoke mounted for adjustment longitudinally of the connecting rod, a plow beam carrying plow blades, pivotally connected with the yoke, a vertically movable supporting wheel mounted on the plow beam and including a sleeve operating in a cylindrical bearing formed at one end of the plow beam, a pivoted arm engaging the sleeve and adapted to move the sleeve vertically whereby the plow beam and blades carried thereby are raised and lowered.

5. In a tractor plow, a tractor, a pivoted connecting member mounted intermediate the ends of the tractor frame, said connecting member including a connecting rod, a plow beam pivotally connected to the connecting rod and adjustable transversely of the plow frame, means for raising and lowering the rear end of said plow beam, said means embodying a cylinder and piston, yieldable means connecting the piston with the connecting member, means for directing liquid to the cylinder at opposite sides of the piston, moving said piston and connecting member connected thereto, pivotally connected rods, one of said rods being connected to the connecting member and the opposite rod being connected to the free end of the plow beam.

GARRY W. TODD.